July 19, 1938.                J. E. TORBERT, JR                 2,124,156
                                  JUNCTION BOX
                          Original Filed March 4, 1936
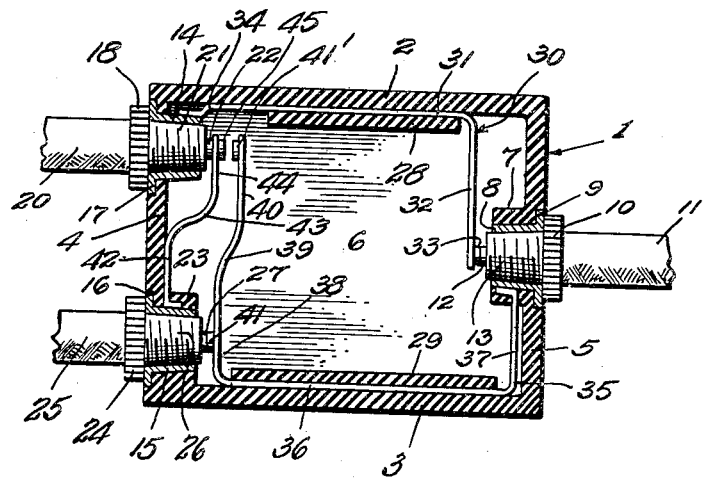
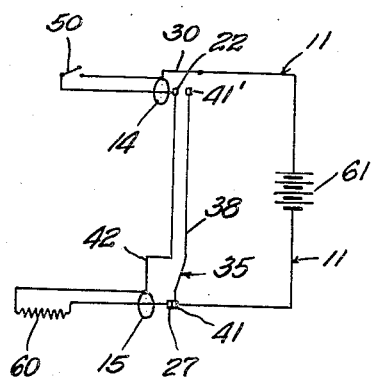 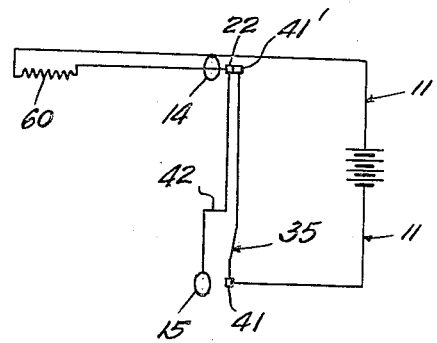
Inventor
John E. Torbert, Jr.
By Lacey & Lacey, Attorneys Patented July 19, 1938

2,124,156

UNITED STATES PATENT OFFICE 2,124,156

JUNCTION BOX

John E. Torbert, Jr., National City, Calif.

Original application March 4, 1936, Serial No. 67,146. Divided and this application September 10, 1936, Serial No. 100,184

3 Claims. (Cl. 247—9)

This invention relates to an improved junction box and is a division of my co-pending application Serial No. 67,146, filed March 4, 1936, for an improved Drill.

One object of the invention is to provide a junction box which may be employed for effectually distributing current either to the motor of my improved drill or to the motor of an electric drill of conventional design.

Another object of the invention is to provide a device of this character which will embody few working parts, which will be efficient in use, and cheap to manufacture.

The invention seeks as a further object to provide a junction box wherein provision is made for permitting the making or breaking of contacts in the box by the insertion or withdrawal, respectively, of cable terminals, so that access to the interior of the box will not be required to be had in order properly to make or break electrical circuits.

And a still further object of the invention is to provide a junction box embodying a casing formed of light weight insulating material which will be easy to handle and which may be employed without danger of shocks to the operator.

Other and incidental objects of the invention will render themselves clearly apparent as the description thereof proceeds.

Referring now to the drawing:

Figure 1 is a longitudinal sectional view of my improved junction box.

Figure 2 is a diagrammatic view showing one circuit arrangement for the box.

Figure 3 is a diagrammatic view showing another arrangement for the box.

Referring now more particularly to the accompanying drawing, wherein like numerals of reference will be seen to designate like parts in all the views, the numeral 1 indicates, in general, my improved junction box which is preferably rectangular in shape and is provided with top and bottom walls 2 and 3 and end walls 4 and 5. The casing is also provided with side walls 6. The casing is preferably formed of bakelite, hard rubber, or any other suitable insulating material.

The end wall 5 of the casing is provided with an inwardly directed boss 7 medially of its height. The boss is axially apertured and is adapted to receive a circular socket 8 formed with an outer flange 9 sunk into the outer surface of the end wall 5. The socket 8 is adapted to removably receive a terminal plug 10 of a two-wire power cable 11. As will be understood, one of the wires of the cable is connected to an axial contact 12 carried at the inner end of the cable while the other of the power wires is connected to a threaded outer surface 13 of the cable so that direct contact will be made with the socket 8. It should be understood that the power cable 11 may be connected to the conventional 110 volt power supply, to batteries, or to any other suitable source of electrical energy.

Formed in the end wall 4 of the casing 1 are openings disposed at the upper and lower ends of said wall and adapted to receive therein metal sockets 14 and 15 which are circular in shape and provided with outer flanges 16 and 17 which are embedded in the outer surface of the end wall 4. The socket 14 is adapted to receive a terminal plug 18 of a service cable 20. The service cable is provided with an externally threaded outer end portion 21 and a central contact 22. The outer end portion is adapted to make electrical contact with the socket 14 for connecting a wire of the service cable with said socket. Another wire of the service cable is connected with the central contact 22. The end wall 4, near its lower end, is substantially doubled in thickness, as indicated at 23. The socket 15 is carried in this thickened portion and is adapted to removably receive the terminal plug 24 of a cable 25. The terminal plug 24 is, like the service cable 20, provided with an exteriorly threaded outer portion 26 adapted to be screwed into the socket 15 to establish electrical connection between said socket and a wire of the cable 25. Another wire of the cable is connected with a central contact 27 on the inner end portion of the cable 25.

The top wall 2 and the bottom wall 3 of the casing are provided, at their inner surfaces, with longitudinally extending thickened portions 28 and 29 and carried by the thickened portion 28 is a conductor strip 30. It will be seen that the conductor strip has a straight portion 31 embedded in the thickened portion 28 while there is also provided for the conductor strip a downwardly substantially right angularly bent portion 32 formed with a contact 33 adapted normally to engage the contact 12 of the power cable 11. The straight portion 31 is extended at the end of the thickened portion opposite that of the right angularly bent portion and is offset at its free end portion, as shown at 34, to lie against and be firmly secured to, by solder or otherwise, the socket 14. It will be seen that the general contour of the conductor strip is that of substantially inverted L-shape.

At the bottom of the casing there is mounted a conductor strip indicated in general by the numeral 35. The conductor strip 35 has a straight portion 36 which extends longitudinally of the casing throughout the major portion of its inner surface and is embedded in the thickened portion 29. The conductor strip 35 is provided with an upwardly bent leg 37 which is bent laterally at its upper end within the boss 7 to contact the socket 8. The conductor strip is provided at its opposite end portion with an upwardly bent relatively long leg 38 which is provided with a central portion 39 and a straight upper portion 40 formed with a contact 41'. The relatively long leg 38 is provided, near its lower extremity, with a contact 41 adapted to confront the contact 27. The leg 38 is resilient so that certain of the contacts may be sprung into and out of engagement. Moreover, the conductor strip 35 is substantially U-shape in general contour. Carried in the casing 1 and adapted to have a portion thereof abut the inner surface of the end wall 4 is a relatively short contact strap 42 having a centrally inwardly offset portion 43 and a straight upper portion 44 provided with a contact 45 which contact is adapted to confront the contact 41.

Although it will be understood that my improved junction box may be operated in any suitable manner, I will discuss here following the general operation of the device. Presuming the device to be used with my improved drill and assuming that switching means for the drill must be connected with the motor thereof, the power cable 11 is first screwed into the socket 8 for contacting one of the wires of said cable with the socket and the contact 12 with the contact 33. The terminal 24 of the cable 25 is screwed into the socket 15 for effecting electrical contact between the socket 15 and one of the wires of the cable 25 and, at the same time, engaging the contacts 27 and 41. As the plug 24 is screwed into the socket 15 and the contacts 27 and 41 are engaged, the relatively long leg 38 of the conductor strip 35 is sprung inwardly for separating the contacts 41' and 45. The service cable is then screwed into place for effecting contact between the outer portion 21 thereof and the socket 14, and the contact 22 and the upper portion 44 of the strip 42. Under this arrangement, it will be seen that current will be led from one of the wires of the power cable 11 through the conductor strip 30 and through one of the wires of the service cable 20 to a suitable switch connected to the end of the service cable, in the present instance the switch being mounted on my improved drill. The return wire from the switch to the service cable is led through the strap 42 to one side of the cable 25, which is connected to the drill motor. The other side of the cable returning from the drill motor is connected, through the contacts 41 and 27, to the conductor strip 35 and thence to the other side of the power cable. It will be understood that the operation of the switch on the drill may be effected for permitting passage of current through my improved junction box to the drill. The switch on the drill is shown in Figure 2 of the drawing and indicated by the numeral 50 while the numeral 60 indicates the load, which, in this case, is the motor of the drill. The numeral 61 indicates the power source.

If it should be desired to remove my improved drill from the circuit and substitute any conventional drill which has the motor, switch and head, or jacket, built as a unit, it is only necessary to remove the cable 25 from the socket 15, which will disengage the contacts 27 and 41 and permit the leg 38 to swing outwardly for engaging the contacts 41 and 45. The service cable 20 is replaced by the power cable or input cable of the device to be used. This arrangement is shown diagrammatically in Figure 3, and it will be seen by referring to Figures 1 and 3 that, under this arrangement, current will flow from one of the wires of the power cable 11 through the contacts 12 and 33, thence through the conductor strip 30 to the socket 14 and thence through one wire of the service cable of the tool to be used to one terminal of said tool. The current will return from the other terminal of said tool through the other wire of the service cable thereof through the contacts 22, 45 and 41', thence through the substantially U-shaped conductor strip 35 to the other of the power wires 11. In other words, there will be no impedance to the current and it will be permitted to flow through the junction box so that the motor of the tool may be controlled independently of the junction box or of external switches.

It is thought that from a reading of the foregoing, it will be understood that I have provided a simple and yet highly efficient junction box which will permit ready change-over from special equipment to conventional equipment and vice versa, and which may be kept in operation for long periods of time without the necessity for repair.

Having thus described the invention, what I claim is:

1. A junction box including a casing having end walls, one of said end walls being provided with a socket, the other of said end walls being provided with a pair of sockets, said sockets being formed of conducting material and said casing being formed of insulating material, a conductor strip carried in the casing and having a contact adapted to confront the first mentioned socket, and engaging a contact carried by the terminal plug of a power cable, a service cable removably connected with one of the sockets of the pair of sockets, said conductor strip having an end connected with said last mentioned sockets, said service cable having a contact, a cable extending into the remaining socket and having a contact, a second conductor strip carried in the casing and having a relatively long upstanding leg terminating in a contact confronting the service cable contact, said upstanding leg having a contact near its lower end and adapted to confront the contact of the last named cable, and a strap connecting the last named socket with the contact of the service cable, said last named cable being adapted to break contact between the service cable and the upstanding leg for permitting current to be led from the power cable to a switch on said service cable and thence to a consuming device through said last named cable.

2. In a device of the class described, a casing, sockets carried by the casing, conductor strips carried in the casing, one of said conductor strips having a substantially right angularly bent portion formed with a contact adapted to confront one of the sockets, a cable removably engageable with said socket and having a contact adapted to engage the contact on said right angularly bent portion, additional cables carried by the casing, another of said conductor strips being formed with an upstanding relatively long leg having a contact adapted to confront another of said cables and a contact disposed near the base of said leg adapted to confront a third of said cables, said third cable being movable inwardly for shifting the uppermost contact on said leg out of engagement with the contact on said second mentioned cable, and a conductor strap adapted for connecting the second and third mentioned cables, said cables and conductor strips and contacts being adapted to cooperate for leading current from certain of the cables to certain of the other cables and switching means to a third cable having a consuming device connected thereto, said third cable being removable for disengaging certain of the contacts and removing a switch from an electric circuit.

3. In a device of the class described, a rectangular casing having a top wall and a bottom wall and end walls, said top and bottom walls having thickened portions, a boss formed in one end wall and having a socket, a pair of spaced bosses carried in the opposite end wall and having sockets therein, said first mentioned socket being adapted to receive a cable, an inverted L-shaped conductor strip carried in the casing and mounted in one of said thickened portions, said conductor strip being adapted to connect a cable in said first mentioned socket and one of said second mentioned sockets, and a substantially U-shaped conductor strip having a straight portion mounted in said other thickened portion and being adapted to connect said first mentioned socket selectively with cables in said second mentioned sockets.

JOHN E. TORBERT, Jr.